(12) United States Patent
Garnett et al.

(10) Patent No.: US 11,022,471 B2
(45) Date of Patent: Jun. 1, 2021

(54) SENSOR ASSEMBLY, SENSOR BRACKET, AND TUBE RING FOR A VIBRATORY CONDUIT

(71) Applicant: Micro Motion, Inc., Boulder, CO (US)

(72) Inventors: Robert Barclay Garnett, Boulder, CO (US); Xue Zi, Nanjing (CN); Yingxue Xu, Nanjing (CN); Xiang Feng, Nanjing (CN)

(73) Assignee: Micro Motion, Inc., Boulder, CO (US)

( * ) Notice: Subject to any disclaimer, the term of this patent is extended or adjusted under 35 U.S.C. 154(b) by 3 days.

(21) Appl. No.: 16/310,195

(22) PCT Filed: Jun. 21, 2016

(86) PCT No.: PCT/CN2016/086542
§ 371 (c)(1),
(2) Date: Dec. 14, 2018

(87) PCT Pub. No.: WO2017/219234
PCT Pub. Date: Dec. 28, 2017

(65) Prior Publication Data
US 2019/0323874 A1    Oct. 24, 2019

(51) Int. Cl.
| | |
|---|---|
| *G01F 1/84* | (2006.01) |
| *G01K 1/14* | (2021.01) |
| *F16L 3/237* | (2006.01) |
| *F16L 3/22* | (2006.01) |
| *F15B 15/28* | (2006.01) |

(52) U.S. Cl.
CPC ............ *G01F 1/8495* (2013.01); *F16L 3/237* (2013.01); *G01F 1/8413* (2013.01); *G01F 1/8422* (2013.01); *F15B 15/2815* (2013.01); *F15B 15/2892* (2013.01); *G01F 1/8427* (2013.01)

(58) Field of Classification Search
CPC .... G01F 1/8495; G01F 1/8422; G01F 1/8413; G01F 1/8427; F16L 3/237; F15B 15/2815
See application file for complete search history.

(56) References Cited

U.S. PATENT DOCUMENTS

| | | |
|---|---|---|
| 5,485,755 A | 1/1996 | Lew |
| 8,104,360 B2 | 1/2012 | Bitto et al. |
| (Continued) | | |

FOREIGN PATENT DOCUMENTS

| | | | |
|---|---|---|---|
| CN | 103363199 A | | 10/2013 |
| JP | 10220421 A | * | 8/1998 |
| (Continued) | | | |

*Primary Examiner* — Tan Le
(74) *Attorney, Agent, or Firm* — The Ollila Law Group LLC (57) ABSTRACT

A sensor assembly (100, 300) for a vibratory conduit (130a, 330) is provided. The sensor assembly (100, 300) includes a sensor bracket (110, 310) having an outer surface (112, 312) substantially symmetric about an axis (S) and including a complementary portion (112c, 312c). The sensor assembly (100, 300) also includes a tube ring (120, 220, 320) having an outer surface (122, 222, 322) including a complementary portion (122c, 222c, 322c) affixed to the complementary portion (112c, 312c) of the sensor bracket (110, 310). The axis (S) of the sensor bracket (110, 310) is external of the vibratory conduit (130a, 330) when the tube ring (120, 220, 320) is affixed to the vibratory conduit (130a, 330).

11 Claims, 5 Drawing Sheets

(56) References Cited

U.S. PATENT DOCUMENTS

| | | | | |
|---|---|---|---|---|
| 9,267,830 B2 * | 2/2016 | Rasche | ................... | F16L 3/237 |
| 2011/0154914 A1 * | 6/2011 | Hussain | ................ | G01F 1/8413 |
| | | | | 73/861.355 |
| 2012/0079891 A1 * | 4/2012 | Hussain | ................ | G01F 1/8413 |
| | | | | 73/861.357 |
| 2012/0227512 A1 * | 9/2012 | Jukes | ........................ | H01F 5/00 |
| | | | | 73/861.357 |

FOREIGN PATENT DOCUMENTS

| | | | | |
|---|---|---|---|---|
| JP | 2004125150 A | * | 4/2004 | .......... F15B 15/2892 |
| WO | 2009043357 A1 | | 4/2009 | |
| WO | 2009120222 A1 | | 10/2009 | |
| WO | 2009120223 A1 | | 10/2009 | |

* cited by examiner

SENSOR ASSEMBLY, SENSOR BRACKET, AND TUBE RING FOR A VIBRATORY CONDUIT

TECHNICAL FIELD

The embodiments described below relate to vibratory sensors and, more particularly, to a sensor assembly, sensor bracket, and tube ring for a vibratory conduit.

BACKGROUND

Vibrating sensors, such as for example, vibrating densitometers and Coriolis flowmeters are generally known, and are used to measure mass flow and other information related to materials flowing through a conduit in the flowmeter. Exemplary Coriolis flowmeters are disclosed in U.S. Pat. Nos. 4,109,524, 4,491,025, and Re. 31,450. These flowmeters have meter assemblies with one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode. When there is no flow through the flowmeter, a driving force applied to the conduit(s) causes all points along the conduit(s) to oscillate with identical phase or with a small "zero offset", which is a time delay measured at zero flow.

As material begins to flow through the conduit(s), Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

A meter electronics connected to the driver generates a drive signal to operate the driver and also to determine a mass flow rate and/or other properties of a process material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired conduit amplitude and frequency. It is also known in the art to provide the pickoffs as a magnet and coil arrangement very similar to the driver arrangement.

The driver and pickoff sensors are typically coupled to the conduits using brackets. However, the brackets may be complex assemblies that are expensive to manufacture and assemble to the vibratory conduit. For example, some brackets are assemblies with multiple pieces, some being removable, that must be affixed to the vibratory conduit using alignment jigs. Other brackets may have a more simple design but are not reliably affixed to the vibratory conduit. For example, some brackets may only contact a cylindrical and flat outer surface of a tube ring at a point, rather than points or a line of the outer surface. As a result, the brazed joint between the bracket and conduit may fail due to relatively high stresses and dynamic forces within the brazing, or other material joining the bracket to the conduit, while the conduit is vibrating or subject to changes in internal pressure or temperature. Accordingly, there is a need for a sensor assembly, sensor bracket, and tube ring for a vibratory conduit.

SUMMARY

A sensor assembly for a vibratory conduit is provided. According to an embodiment, the sensor assembly comprises a sensor bracket having an outer surface substantially symmetric about an axis and including a complementary portion and a tube ring having an outer surface including a complementary portion affixed to the complementary portion of the sensor bracket. The axis of the sensor bracket is external of the vibratory conduit when the tube ring is affixed to the vibratory conduit.

A sensor bracket for a vibratory conduit is provided. According to an embodiment, the sensor bracket comprises an outer surface substantially symmetric about an axis, wherein the axis is external of the vibratory conduit when the sensor bracket is affixed to a tube ring that is affixed to the vibratory conduit. The outer surface has a complementary portion configured to interface with the one of the tube ring and the vibratory conduit.

A tube ring for a vibratory conduit is provided. According to an embodiment, the tube ring comprises an outer surface substantially symmetric about an axis, wherein the axis is substantially coaxial with an axis of a vibratory conduit when the tube ring is affixed to the vibratory conduit. The outer surface has a complementary portion configured to interface with a sensor bracket.

ASPECTS

According to an aspect, a sensor assembly (100, 300) for a vibratory conduit (130a, 330) comprises a sensor bracket (110, 310) having an outer surface (112, 312) substantially symmetric about an axis (S) and including a complementary portion (112c, 312c) and a tube ring (120, 220, 320) having an outer surface (122, 222, 322) including a complementary portion (122c, 222c, 322c) affixed to the complementary portion (112c, 312c) of the sensor bracket (110, 310). The axis (S) of the sensor bracket (110, 310) is external of the vibratory conduit (130a, 330) when the tube ring (120, 220, 320) is affixed to the vibratory conduit (130a, 330).

Preferably, one of the complementary portion (312c) of the sensor bracket (310) and the complementary portion (122c, 222c) of the tube ring (120, 220) comprises a groove.

Preferably, one of the groove of the sensor bracket (310) is substantially symmetric about the axis (S) of the sensor bracket (310) and the groove of the tube ring (120, 220) is substantially symmetric about the axis (R) of the tube ring (120, 220).

Preferably, the axis (S) of the sensor bracket (110, 310) is orthogonal to an axis (T) of the vibratory conduit (130a, 330).

Preferably, the axis (R) of the tube ring (120, 220, 320) is substantially coaxial with an axis (T) of the vibratory conduit (130a, 330).

Preferably, one of the outer surface (112, 212) of the sensor bracket (110, 210) and the outer surface (322) of the tube ring (320) comprises a cylindrical shape.

According to an aspect, a sensor bracket (110, 310) for a vibratory conduit (130a, 330), comprises an outer surface (112, 312) substantially symmetric about an axis (S), wherein the axis (S) is external of the vibratory conduit (130a, 330) when the sensor bracket (110, 310) is affixed to a tube ring (120, 220) that is affixed to the vibratory conduit (130*a*, 330). The outer surface (112, 312) has a complementary portion (112*c*, 312*c*) configured to interface with the one of the tube ring (120, 220) and the vibratory conduit (130*a*, 330).

Preferably, the complementary portion (312*c*) of the sensor bracket (310) is comprised of a groove formed in the outer surface (312) of the sensor bracket (310).

Preferably, the groove of the sensor bracket (310) is substantially symmetric about the axis (S) of the sensor bracket (310).

Preferably, the outer surface (112) comprises a cylindrical shape.

According to an aspect, a tube ring (120, 220, 320) for a vibratory conduit (130*a*, 330) comprises an outer surface (122, 222, 322) substantially symmetric about an axis (R), wherein the axis (R) is substantially coaxial with an axis (T) of a vibratory conduit (130*a*, 330) when the tube ring (120, 220, 320) is affixed to the vibratory conduit (130*a*, 330). The outer surface (122, 222, 322) has a complementary portion (122*c*, 222*c*) configured to interface with a sensor bracket (110, 310).

Preferably, the complementary portion (122*c*, 222*c*) of the tube ring (120, 220) comprises a groove formed in the outer surface (122, 222) of the tube ring (120, 220).

Preferably, the groove of the tube ring (120, 220) is substantially symmetric about the axis (R) of the tube ring (120, 220).

Preferably, the outer surface (322) comprises a cylindrical shape.

BRIEF DESCRIPTION OF THE DRAWINGS

The same reference number represents the same element on all drawings. It should be understood that the drawings are not necessarily to scale.

DETAILED DESCRIPTION

FIGS. 1-10 and the following description depict specific examples to teach those skilled in the art how to make and use the best mode of embodiments of a sensor assembly, sensor bracket, and tube ring for a vibratory conduit. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the sensor assembly, sensor bracket, and tube ring for the vibratory conduit. As a result, the embodiments described below are not limited to the specific examples described below, but only by the claims and their equivalents.

The sensor bracket and tube ring may be part of a sensor assembly that is affixed to a vibratory conduit. The sensor bracket can be comprised of an outer surface that is substantially symmetric about an axis. The axis of the sensor bracket is external of a vibratory conduit. The outer surface of the sensor bracket has a complementary portion that is configured to interface with a complementary portion of a vibratory conduit or a tube ring affixed to the vibratory conduit. That is, the complementary portions of the sensor bracket and the tube ring or vibratory conduit are contacting points or lines, rather than a contacting point. Similar to the sensor bracket, the tube ring may also be substantially symmetric about their respective axes.

Due to the outer surfaces of the sensor bracket and tube ring being substantially symmetric about their respective axes, the sensor bracket and tube ring can be inexpensively manufactured with tightly controlled dimensions. The tightly controlled dimensions can ensure that the complementary portions are proximate or congruent surfaces during, for example, brazing, or other suitable process. The proximate or congruent surfaces can ensure that stresses are reduced in the brazing thereby reducing the probability that the brazing will fail. Therefore, the sensor assembly, sensor bracket, and tube ring can be less expensive and have improved functional lives compared to more complex sensor assemblies or sensor brackets that contact the vibratory conduit at a point.

Figure 1:
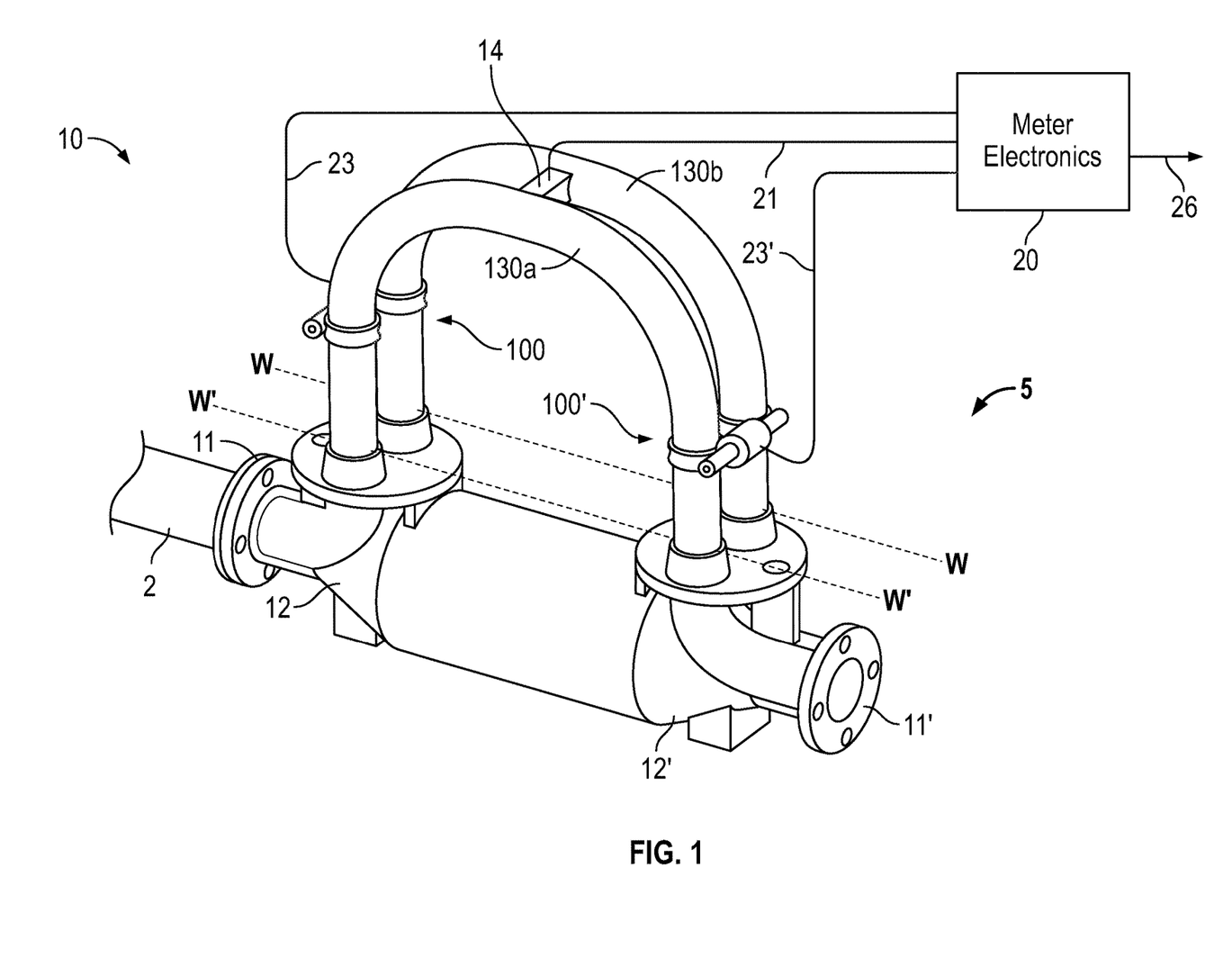
FIG. 1 shows a vibratory meter 5 according to an embodiment.

FIG. 1 shows a vibratory meter 5 according to an embodiment. As shown in FIG. 1, the vibratory meter 5 comprises a meter assembly 10 and meter electronics 20. The meter assembly 10 responds to mass flow rate and density of a process material. The meter electronics 20 is connected to the meter assembly 10 via leads to provide density, mass flow rate, and temperature information over path 26, as well as other information. A Coriolis flow meter structure is described although it is apparent to those skilled in the art that the present invention could be practiced as a vibrating tube densitometer, tuning fork densitometer, or the like.

The meter assembly 10 includes a pair of manifolds, flanges having flange necks, a pair of parallel vibratory conduits 130*a*, 130*b*, drive mechanism 14, and two pairs of sensor assemblies 100, 100'. Vibratory conduits 130*a*, 130*b* have two essentially straight inlet legs and outlet legs, which converge towards each other at vibratory conduit mounting blocks. The vibratory conduits 130*a*, 130*b* bend at two symmetrical locations along their length and are essentially parallel throughout their length. Brace bars can serve to define the axis W and W' about which each vibratory conduit 130*a*, 130*b* oscillates. The inlet and outlet legs of the vibratory conduits 130*a*, 130*b* are fixedly attached to vibratory conduit mounting blocks and these blocks, in turn, are fixedly attached to manifolds 12, 12'. This provides a continuous closed material path through meter assembly 10.

When flanges are connected, via an inlet 11 and an outlet 11', into a process line 2 which carries the process material that is being measured, material enters the inlet 11 of the meter assembly 10 through an orifice in the flange and is conducted through the manifold 12 to the vibratory conduit mounting block. Within the manifold 12, the material is divided and routed through the vibratory conduits 130*a*, 130*b*. Upon exiting the vibratory conduits 130*a*, 130*b*, the process material is recombined in a single stream within the block and the manifold 12' and is thereafter routed to the outlet 11' connected by the flange 103 to the process line (not shown).

The vibratory conduits 130*a*, 130*b* are selected and appropriately mounted to the vibratory conduit mounting blocks so as to have substantially the same mass distribution, moments of inertia and Young's modulus about bending axes W-W and W'-W', respectively. These bending axes go through the brace bars. Inasmuch as the Young's modulus of the vibratory conduits change with temperature, and this change affects the calculation of flow and density, a resistive temperature detector (RTD) may be mounted to the vibratory conduit 130a to continuously measure the temperature of the vibratory conduit 130a. The temperature of the vibratory conduit 130a and hence the voltage appearing across the RTD for a given current passing therethrough is governed by the temperature of the material passing through the vibratory conduit 130a. The temperature dependent voltage appearing across the RTD is used in a well-known method by the meter electronics 20 to compensate for the change in elastic modulus of the vibratory conduits 130a due to any changes in vibratory conduit temperature. The RTD may be connected to the meter electronics 20 by a lead.

Both of the vibratory conduits 130a, 130b are driven by drive mechanism 14 in opposite directions about their respective bending axes W-W and W'-W' and at what is termed the first out-of-phase bending mode of the flow meter. This drive mechanism 14 may comprise any one of many well-known arrangements, such as a magnet mounted to the vibratory conduit 130a and an opposing coil mounted to the vibratory conduit 130b and through which an alternating current is passed for vibrating both vibratory conduits 130a, 130b. A suitable drive signal is applied by the meter electronics 20, via lead 21, to the drive mechanism 14.

The meter electronics 20 receives the left and right sensor signals appearing on leads 23, 23', respectively, from the left and right sensor assembly 100, 100'. The meter electronics 20 produces the drive signal appearing on lead 21 to drive mechanism 14 and vibrate the vibratory conduits 130a, 130b. The meter electronics 20 processes the left and right sensor signals to compute the mass flow rate and the density of the material passing through meter assembly 10. This information, along with other information, is applied by meter electronics 20 over path 26 as a signal.

As shown, the sensor assemblies 100, 100' include sensor brackets, pickoff sensors that are disposed between and coupled to the sensor brackets and tube rings. The tube rings are affixed to and formed integral with the vibratory conduits 130a, 130b. However, in alternative embodiments, the sensor assemblies may not include the tube ring. The tube ring and sensor bracket may be inexpensively manufactured and provide reduced stresses and dynamic forces in the brazing joint between the sensor bracket and and/or tube ring and conduit, as the following explains in more detail.

Figure 2:
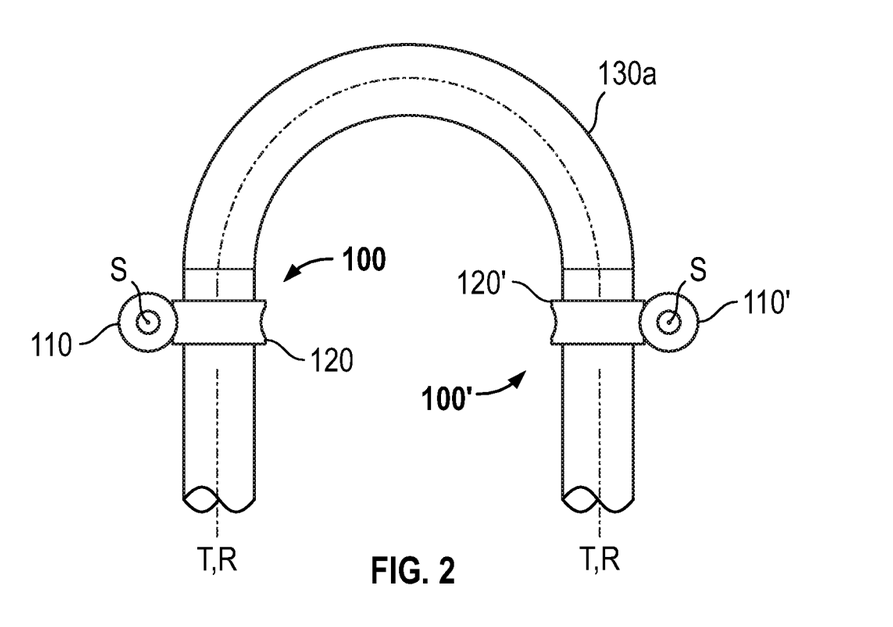
FIGS. 2 and 3 show a partial side and perspective view of the sensor assemblies 100, 100' shown in FIG. 1.
Figure 3:
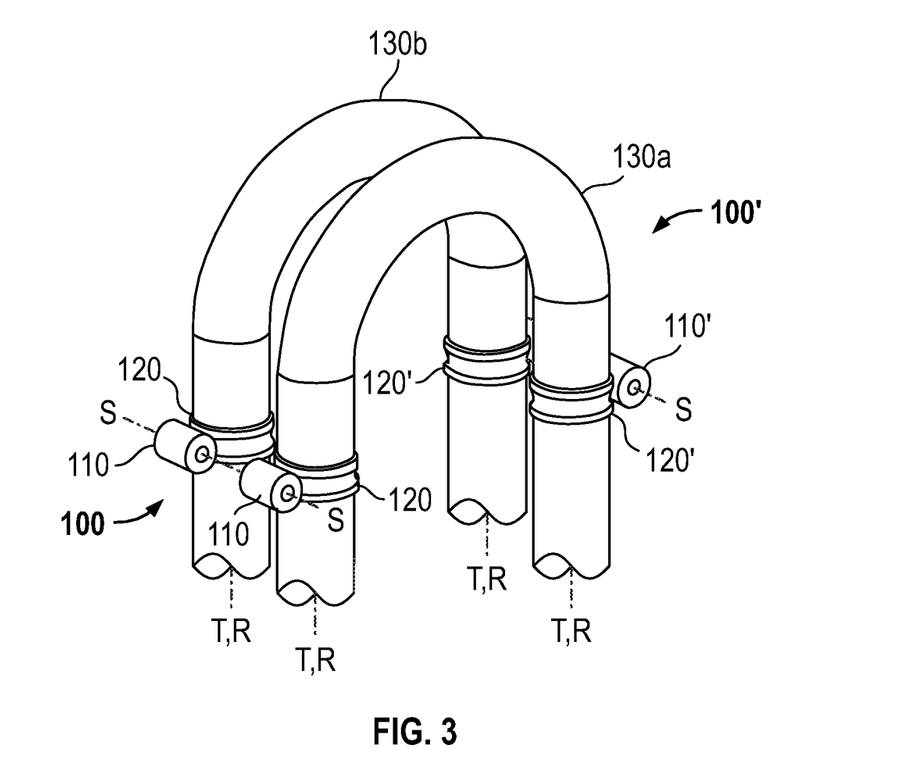

FIGS. 2 and 3 show a partial side and perspective view of the sensor assemblies 100, 100' shown in FIG. 1. As shown in FIG. 2, each of the sensor assemblies 100, 100' includes the vibratory conduits 130a, 130b. Each of the sensor assemblies 100, 100' is comprised of sensor brackets 110, 110' affixed to tube rings 120, 120'. The tube rings 120, 120' are affixed to an outer surface of the vibratory conduits 130a, 130b. However, in alternative embodiments, such as the embodiment described with reference to FIG. 10, the tube rings 120, 120' may not be employed. The vibratory conduits 130a, 130b are shown with axes T. The axes T are longitudinal axes of the vibratory conduits 130a, 130b and are located at the geometric cross-sectional center of each of the vibratory conduits 130a, 130b. An electrical sensor shown in FIG. 1 as being disposed between each pair of sensor brackets 110, 110' is not shown in FIGS. 2 and 3 for clarity. Also for clarity, the following discussion refers to the sensor assembly 100 on the left side of FIGS. 2 and 3.

The sensor brackets 110 have a cylindrical shape, although any suitable shape may be employed in alternative embodiments. Each of the sensor brackets 110 include an axis S. The axis S is an axis of symmetry for the sensor bracket 110. For example, as is described in more detail with reference to FIG. 7, surfaces of the sensor brackets 110 are substantially symmetric about the axis S. In addition, the axis S of the sensor brackets 110 are external of the vibratory conduits 130a, 130b. That is, the axis S does not intersect with the vibratory conduits 130a, 130b. As shown, the axis S of the sensor bracket 110 is orthogonal to the axis T of the vibratory conduit, although the axes S, T may have any suitable angular relationship in alternative embodiments. As is described with reference to FIG. 7, the sensor brackets 110 include a complementary portion that is configured to interface with a complementary portion on the tube ring 120.

The tube rings 120 also have a shape symmetric (e.g., an axisymmetric shape) about an axis R that, as can be appreciated from FIGS. 2 and 3, is coaxial with the axis T of the vibratory conduit 130a, 130b. The axis R of the tube ring 120 is an axis of symmetry of the tube ring 120. For example, as is described with reference to FIGS. 4-6, surfaces of the tube ring 120 are substantially symmetric about the axis R. As shown, the axis R of the tube ring 120 is coaxial with the axis of the vibratory conduit T, although the axes R, T may have any suitable positional relationship (e.g., parallel, angled, etc.) and be substantially coaxial in alternative embodiments. As is described in more detail in the following with reference to FIGS. 4-6, the tube rings 120 include a complementary portion that is configured to interface with a complementary portion on the sensor bracket 110.

The tube rings 120 are affixed to an outer surface of the vibratory conduits 130a, 130b. Although the tube rings 120 are affixed to the outer surface of the vibratory conduits 130a, 130b, alternative embodiments may employ tube rings that are integral to the vibratory conduits. For example, the alternative vibratory conduits could have a portion with a thicker wall compared to other portions of the alternative vibratory conduit. In another alternative embodiment, the tube ring could be a section of the vibratory conduit, where the section forming the tube ring has thicker walls than the remainder of the vibratory conduit. The section forming the tube ring could abut the portion forming the remainder of the vibratory conduit.

Tube Rings

Figures 4, 5:
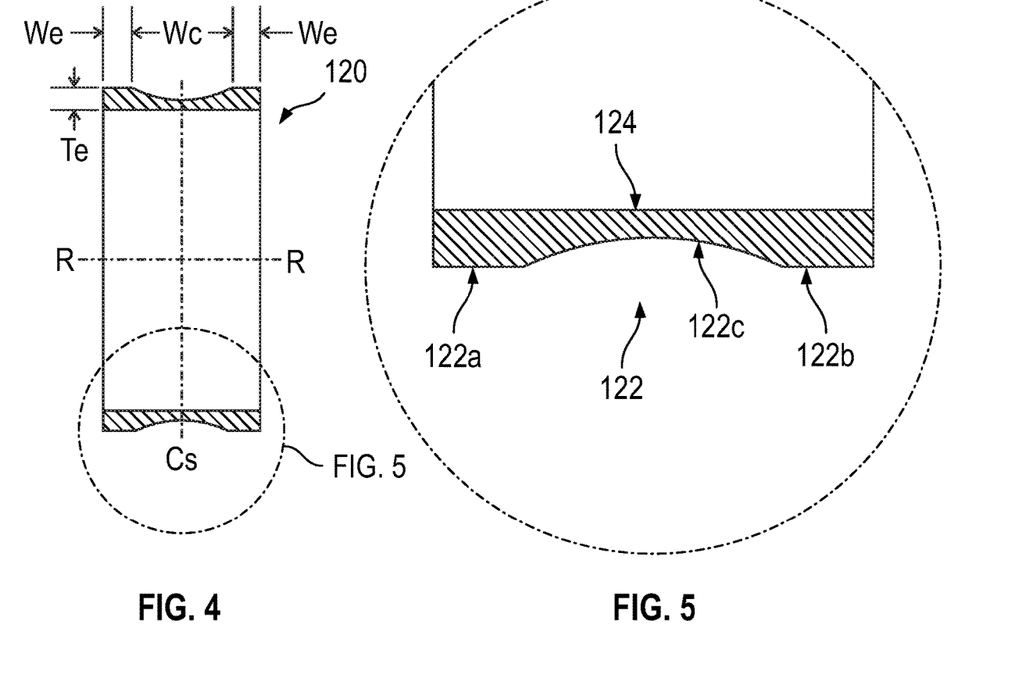
FIGS. 4-6 show cross-sectional and perspective views of one of the tube rings 120 shown in FIGS. 1-3.
Figure 6:
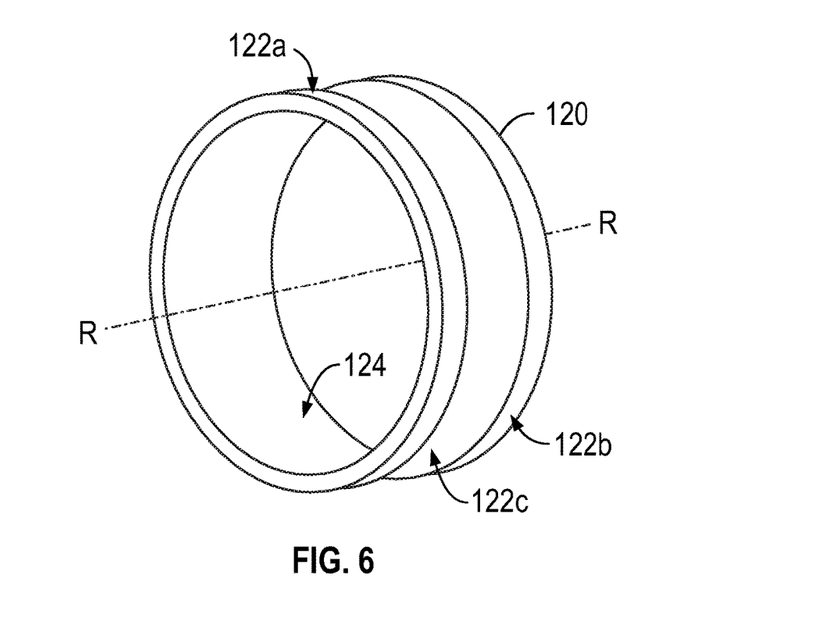

FIGS. 4-6 show cross-sectional and perspective views of one of the tube rings 120 shown in FIGS. 1-3. As shown in FIGS. 4-6, the tube ring 120 includes an axis R that extends along the geometric cross-section of the tube ring 120. The tube ring 120 has an outer surface 122 and an inner surface 124 that are substantially symmetric about the axis R of the tube ring 120. The tube ring 120 may be affixed to the vibratory conduit 130a, 130b so as to be integral with the vibratory conduit 130a, 130b. When affixed, the inner surface 124 is coupled (e.g., bonded, brazed, welded, adhered, etc.) to the vibratory conduit 130a, 130b and the outer surface 122 of the tube ring 120 forms a portion of an outer surface of the vibratory conduit 130a, 130b.

The outer surface 122 and inner surface 124 of the tube ring 120 have cylindrical shapes, although any suitable shape may be employed in alternative embodiments. For example, an outer surface of an alternative tube ring could have an oval, hexagonal, etc., shape and be substantially symmetric about the axis R of the alternative tube ring. In addition, although the outer surface 122 is symmetric about the axis R of the tube ring 120, the outer surface 122 may include features, such as threads or other features for other components, etc., that are non-symmetric. The inner surface 124 can similarly include non-symmetric features that, for example, interface with the vibratory conduit 130a, 130b.

The outer surface 122 includes a first and second edge portion 122a, 122b and a complementary portion 122c. In the cross-sectional view of FIG. 4, the first and second edge portion 122a, 122b are on opposing sides of the complementary portion 122c. That is, the complementary portion 122c is disposed between and adjacent to the first and second edge portion 122a, 122b. The complementary portion 122c is configured to interface with the sensor bracket 110 shown in FIGS. 1-3, whereas the first and second edge portion 122a, 122b are not configured to interface with the sensor bracket 110.

In the cross-sectional view shown in FIG. 5, the first and second edge portion 122a, 122b are flat and parallel with the axis R of the tube ring 120. However, in alternative embodiments, the first and second edge portions 122a, 122b may have slopes, curves, or other shapes. The first and second edge portion 122a, 122b have the same width We and thickness Te. However, the first and second edge portions 122a, 122b may have different widths We and/or thicknesses Te in alternative embodiments. For example, in alternative tube rings, the width of the first edge portion may be different than the width of the second edge portion. The width of one or both of the edge portions may be zero, such that the width of the complementary portion is defined by the width of the tube ring. As shown in FIG. 5, the first and second edge portion 122a, 122b define a width We of the complementary portion 122c.

As shown in FIGS. 4-7, the complementary portion 122c is comprised of a groove in the outer surface 122 of the tube ring 120. The complementary portion 122c has an arcuate cross-sectional shape although any suitable shape may be employed in alternative embodiments. The arcuate cross-sectional shape is symmetric about a cross-sectional axis of symmetry Cs of the tube ring 120. The cross-sectional axis of symmetry Cs defines where complementary portion 122c is symmetric along the tube ring axis R. The complementary portion 122c extends circumferentially about the outer surface 122 of the tube ring 120. The complementary portion 122c has a minimal thickness that is collocated with the cross-sectional axis of symmetry Cs.

Sensor Bracket

Figure 7:
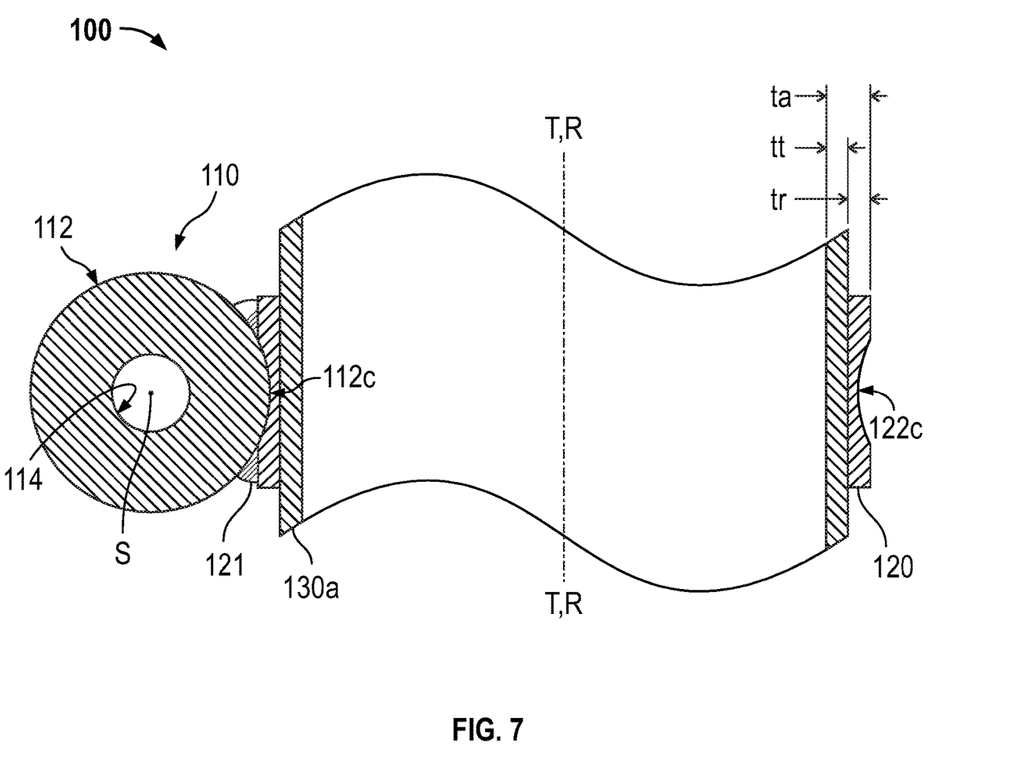
FIG. 7 shows the sensor bracket 110 affixed to the vibratory conduit 130*a* according to an embodiment.

FIG. 7 shows the sensor bracket 110 affixed to the vibratory conduit 130a according to an embodiment. As shown in FIG. 7, the sensor bracket 110 is affixed to the outer surface 122 of the tube ring 120 and the vibratory conduit 130a. In particular, an outer surface 112 of the sensor bracket 110 includes a complementary portion 112c that interfaces the complementary portion 122c of the tube ring 120. The sensor bracket 110 also includes an inner surface 114. The sensor bracket 110 is affixed to the tube ring 120 using brazing 121 illustrated as brazing material extending from the complementary portions 112c, 122c, which are in contact. The brazing 121 extends between the complementary portions 112c, 122c throughout the points or line. The brazing 121 illustrated as extending from between the complementary portions 112c, 122c may have different shapes and may be more or less than what is shown. The axis S of the sensor bracket 110 extends orthogonal to the axis T of the vibratory conduit 130a.

As shown in FIG. 7, the tube 130a has a wall thickness tt that is approximately the same as a wall thickness tr of the tube ring 120. In alternative embodiments, other wall thicknesses of the tube ring and/or sensor bracket may be employed. The total wall thickness ta is the sum of the wall thickness tr, tt of the tube ring 120 and the vibratory conduit 130a. That is, the total wall thickness ta is greater than the wall thickness tt of the vibratory conduit 130a, 130b. The thicker wall thickness ta can reduce the stress that may develop due to loads, such as thermal and pressure loads. The thicker wall thickness ta can also reduce stress from sensor vibration or other dynamic loads that act on the sensor bracket 110 when the vibratory conduits 130a, 130b are vibrating.

Alternative Tube Rings and Sensor Brackets

Figure 8:
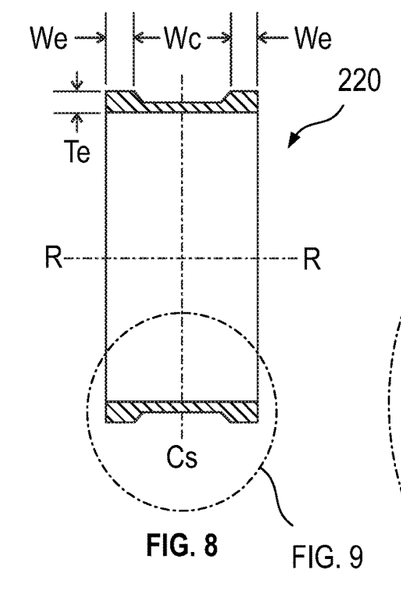
FIGS. 8 and 9 show a tube ring 220 according to an alternative embodiment.
Figure 9:
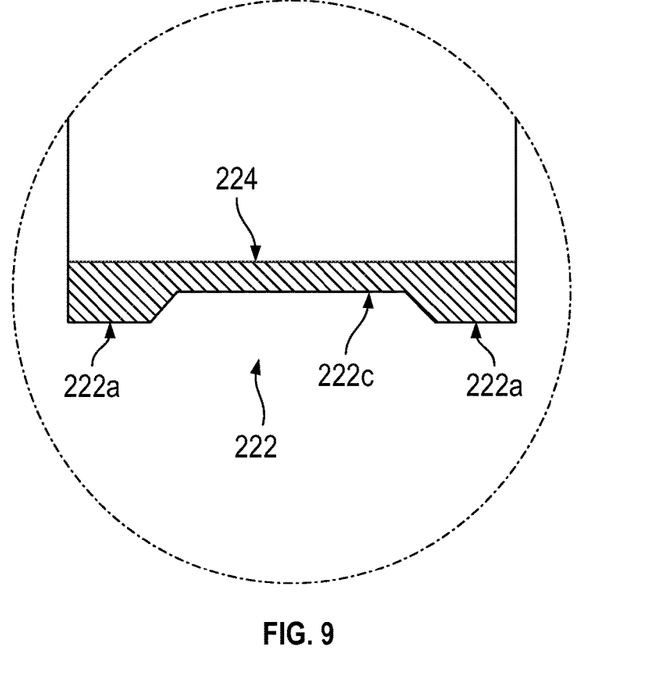

FIGS. 8 and 9 show a tube ring 220 according to an alternative embodiment. As shown in FIGS. 8 and 9, the tube ring 220 includes an axis R that extends along the center of the geometric cross-section of the tube ring 220. The tube ring 220 has an outer surface 222 and an inner surface 224 that are substantially symmetric about the axis R of the tube ring 220, in a manner similar to the tube ring 120 described with reference to FIGS. 4-6. The tube ring 220 may be affixed to, for example, the vibratory conduit 130a, 130b so as to be integral to the vibratory conduit 130a, 130b. When affixed, the inner surface 224 is coupled to the vibratory conduit 130a, 130b and the outer surface 222 of the tube ring 220 forms a portion of an outer surface of the vibratory conduit 130a, 130b. As shown, the outer surface 222 includes a complementary portion 222c.

The outer surface 222 and the inner surface 224 of the tube ring 220 have a cylindrical shape, although any suitable shape may be employed in alternative embodiments. In addition, although the outer surface 222 is substantially symmetric about the axis R of the tube ring 220, the outer surface 222 may include features, such as threads or other features for other components, etc., that are non-symmetric. The inner surface 224 can similarly include non-symmetric features that, for example, interface with the vibratory conduit 130a, 130b.

The outer surface 222 of the tube ring 220 includes a first and second edge portion 222a, 222b and a complementary portion 222c. The first and second edge portion 222a, 222b are on opposing sides of the complementary portion 222c. That is, the complementary portion 222c is disposed between and adjacent to the first and second edge portion 222a, 222b. The complementary portion 222c is configured to interface with a sensor bracket, whereas the first and second edge portion 222a, 222b are not configured to interface with the sensor bracket. The sensor bracket may, for example, have an outer surface with a hexagonal cross-section that interfaces with the complementary portion 222c.

The first and second edge portion 222a, 222b are flat and parallel with the axis R of the tube ring 220. However, in alternative embodiments, the first and second edge portions 222a, 222b may have slopes, curves, or other shapes. The first and second edge portion 222a, 222b have the same width We and thickness Te. However, the first and second edge portions in alternative embodiments may have different widths We and/or thicknesses Te. For example, in alternative tube rings, the width of the first edge portion may be different than the width of the second edge portion. The width of one or both of the edge portions may be zero, such that the width of the complementary portion is defined by the width of the tube ring. The first and second edge portion 222a, 222b define a width We of the complementary portion 222c.

The complementary portion 222c is comprised of a groove in the outer surface 222 of the tube ring 220. The complementary portion 222c has a hexagonal cross-sectional shape although any suitable shape may be employed in alternative embodiments. The hexagonal cross-sectional shape is symmetric about a cross-sectional axis of symmetry Cs of the tube ring 220. The cross-sectional axis of symmetry Cs defines where complementary portion 222c is symmetric along the axis R of the tube ring 220. The complementary portion 222c extends circumferentially about the outer surface 222 of the tube ring 220. The complementary portion 222c has a minimal thickness that is collocated with the cross-sectional axis of symmetry Cs.

Figure 10:
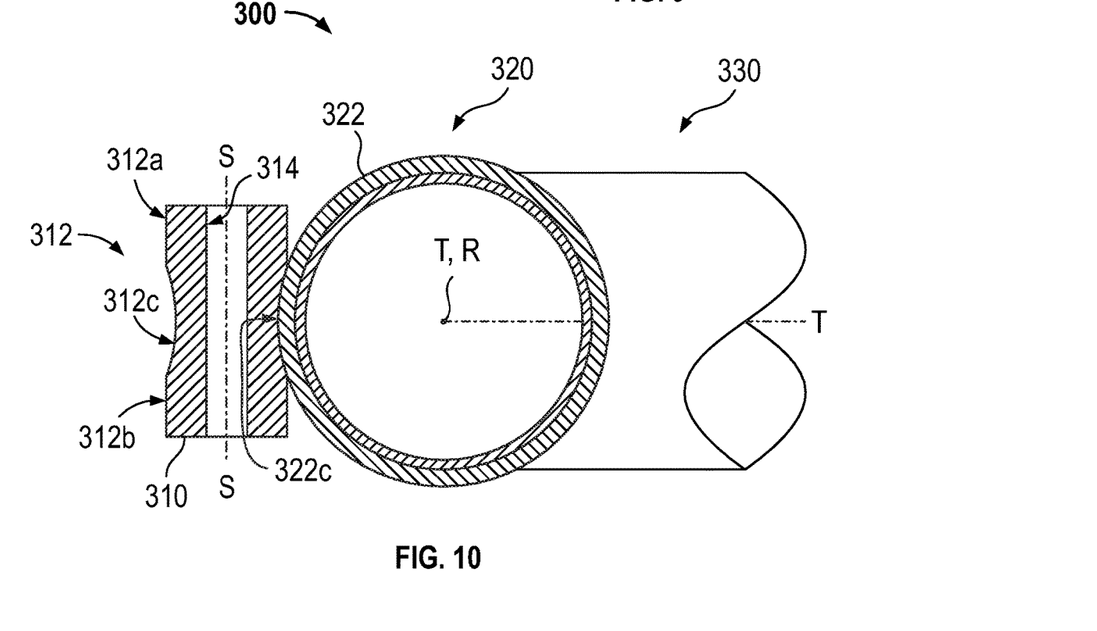
FIG. 10 shows a sensor assembly 300 according to an alternative embodiment.

FIG. 10 shows sensor assembly 300 according to an alternative embodiment. As shown in FIG. 10, the sensor assembly 300 includes a sensor bracket 310 and a tube ring 320. Also shown is a vibratory conduit 330. The sensor bracket 310 is affixed to the tube ring 320. The tube ring 320 is affixed to the vibratory conduit 330. The tube ring 320 includes an outer surface 322 that is cylindrically shaped and symmetric about an axis R. As shown, the axis R of the tube ring 320 is coaxial with the axis of the vibratory conduit 330, but may be substantially coaxial in alternative embodiments. The sensor bracket 310 includes an outer surface 312 and inner surface 314, which may have features, such as threads, for coupling to a sensor or magnet keeper, or the like.

The outer surface 312 and inner surface 314 of the sensor bracket 310 are substantially symmetric about an axis S of the sensor bracket 310. The axis S of the sensor bracket 310 is external of a vibratory conduit 330. The axis S of the sensor bracket 310 is also orthogonal to the axis T of the vibratory conduit 330. The outer surface 312 of the sensor bracket 310 has a complementary portion 312c that is interfaced with a complementary portion 322c of the outer surface 322 of the tube ring 320.

The outer surface 312 of the sensor bracket 310 includes a first and second edge portion 312a, 312b and complementary portion 312c. The first and second edge portion 312a, 312b are on opposing sides of the complementary portion 312c. That is, the complementary portion 312c is disposed between and adjacent to the first and second edge portion 312a, 312b. The complementary portion 312c is configured to interface with the vibratory conduit 330 whereas the first and second edge portion 312a, 312b are not configured to interface with the vibratory conduit 330.

As shown, the first and second edge portion 312a, 312b are flat and parallel with the axis S of the sensor bracket 310. However, in alternative embodiments, the first and second edge portions 312a, 312b may have slopes, curves, or other shapes. The first and second edge portion 312a, 312b have the same width and thickness. However, the first and second edge portions may have different widths and/or thicknesses in alternative embodiments. For example, in alternative sensor brackets, the width of the first edge portion may be different than the width of the second edge portion. The width of one or both of the edge portions may be zero, such that the width of the complementary portion is defined by the width of the sensor bracket. As shown in FIG. 10, the first and second edge portion 312a, 312b define a width of the complementary portion 312c.

The complementary portion 312c is comprised of a groove in the outer surface 312 of the sensor bracket 310. The complementary portion 312c has an arcuate cross-sectional shape although any suitable shape may be employed in alternative embodiments. The arcuate cross-sectional shape is symmetric about a cross-sectional axis of symmetry of the sensor bracket 310. The complementary portion 312c extends circumferentially about the outer surface 312 of the sensor bracket 310. The complementary portion 312c has a minimal thickness that is collocated with the cross-sectional axis of symmetry.

Manufacturing Process

The sensor bracket 110, 310 and tube ring 120, 220, 320 may be formed by any suitable manufacturing process. However, due to the outer surface 112, 312, 122, 222, 322 being symmetric about an axis S, less expensive and more tightly controlled manufacturing processes may be employed. For example, the sensor bracket 110, 310 may be formed from bar stock or billets that are extruded or rolled into shape. A diameter of the sensor bracket 110, 310 may be chosen to be at or about the dimension of a widely available bar stock. Additionally, the outer surfaces 112, 312 on the sensor bracket 110, 310 may be further formed by turning the bar stock, or any other suitable material, on a lathe. Similar processes may be employed with the tube ring 120, 220 and/or vibratory conduit 330.

The lathe and other similar manufacturing processes can inexpensively and tightly control the dimension of the outer surface 112, 122, 222, 312, 322 with a high throughput. The lathe or other similar manufacturing process may also be used to form the complementary portion 112c, 122c, 222c, 312c, 322c of the outer surface 112, 212, 222, 312, 322. For example, a turning tool may track a template that corresponds to the outer surface 112, 212, 222, 312, 322, including the complementary portion 112c, 122c, 222c, 312c, 322c, while cutting into the bar stock. After forming the outer surface 112, 212, 222, 312, 322 in the bar stock, or other suitable material, the sensor bracket 110, 310 and tube ring 120, 220, 320 can be formed by shearing, cutting, etc., the bar stock.

The sensor bracket 110, 310 may be affixed to the tube ring 120, 320 with any suitable method, such as brazing, welding, employing adhesives, or the like. The complementary portions 112c, 222c, 312c, 322c can interface with each other such that there is a small gap over the points or lines of the interfacing complementary portions 112c, 222c, 312c, 322c. The small gap can ensure that the brazed joint has a desirable strength. In addition, the points or lines of the complementary portions 112c, 222c, 312c, 322c may be chosen such that, for example, stresses in the brazed joint are at a desirable level. The shapes of the complementary portions 112c, 222c, 312c, 322c can align the sensor brackets 110, 310 to the desired orientation (e.g., orthogonal) and position relative to the tube ring 120, 220, 320 without the use of alignment fixtures during the manufacturing process.

The embodiments described above provide the sensor bracket 110, 310 and tube ring 120, 220, 320 for the vibratory conduit 130a, 130b, 330. By employing inexpensive and tightly controlled manufacturing processes, the sensor bracket 110, 310 and tube ring 120, 220, 320 can be inexpensively manufactured and have improved characteristics. For example, the complementary portions 112c, 122c, 222c, 312c, 322c may tightly fit with each other to ensure a reliable brazing process. Accordingly, the sensor assembly 100, 300 can function without failure in the brazing joint between the sensor bracket 110, 310 and the tube ring 120, 220, 320. Other benefits may be realized.

For example, stresses can develop in a joint between the sensor bracket 110, 310 and a tube ring 120, 220, 320. The stresses can be due to static loads, such as pressure of the fluid in the vibratory conduit 130a, 130b, 330, thermal loads, etc., or dynamic loads, such as operation or vibration of the sensor assembly 100, 300. The complementary portions 112c, 122c, 222c, 312c, 322c increase the braze joint size between the outer surfaces 112, 312 of the sensor bracket 110, 310 and the outer surfaces 122, 322 of the tube ring 120, 320 or vibratory conduit 130a, 130b, 330. The points or lines can reduce stress in the brazing. Therefore, the points or line of contact can improve the reliability of the brazed joint over a single contact point. Additional benefits include using cylindrical or rod shaped bracket to be used without loss of control of tube-to-tube bracket concentricity or spacing.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other sensor brackets and tube rings for vibratory conduits and not just to the embodiments described above and shown in the accompanying figures. Accordingly, the scope of the embodiments described above should be determined from the following claims.

We claim:

1. A sensor assembly (100, 300) for a vibratory conduit (130a, 330), comprising:
   a sensor bracket (110, 310) having an outer surface (112, 312) substantially symmetric about an axis (S) and including a complementary portion (112c, 312c) extending circumferentially about the outer surface (112, 312); and
   a tube ring (120, 220, 320) having an outer surface (122, 222, 322) including a complementary portion (122c, 222c, 322c) extending circumferentially about the outer surface (122, 222, 322) and affixed to the complementary portion (112c, 312c) of the sensor bracket (110, 310), the tube ring (120, 220, 320) being substantially symmetric about an axis (R) of the tube ring (120, 220, 320);
   wherein the axis (S) of the sensor bracket (110, 310) is external of the vibratory conduit (130a, 330) when the tube ring (120, 220, 320) is affixed to the vibratory conduit (130a, 330).

2. The sensor assembly (100, 300) of claim 1, wherein one of the complementary portion (312c) of the sensor bracket (310) and the complementary portion (122c, 222c) of the tube ring (120, 220) comprises a groove.

3. The sensor assembly (100, 300) of claim 2, wherein one of:
   the groove of the sensor bracket (310) is substantially symmetric about the axis (S) of the sensor bracket (310); and
   the groove of the tube ring (120, 220) is substantially symmetric about the axis (R) of the tube ring (120, 220).

4. The sensor assembly (100, 300) of claim 1, wherein the axis (S) of the sensor bracket (110, 310) is orthogonal to an axis (T) of the vibratory conduit (130a, 330).

5. The sensor assembly (100, 300) of claim 1, wherein the axis (R) of the tube ring (120, 220, 320) is substantially coaxial with an axis (T) of the vibratory conduit (130a, 330).

6. The sensor assembly (100, 300) of claim 1, wherein one of the outer surface (112, 212) of the sensor bracket (110, 210) and the outer surface (322) of the tube ring (320) comprises a cylindrical shape.

7. A sensor bracket (110, 310) for a vibratory conduit (130a, 330), comprising:
   an outer surface (112, 312) substantially symmetric about an axis (S) and including a complementary portion (112c, 312c) extending circumferentially about the outer surface (112, 312), wherein:
   the axis (S) is external of the vibratory conduit (130a, 330) when the sensor bracket (110, 310) is affixed to a tube ring (120, 220) that is affixed to the vibratory conduit (130a, 330); and
   the outer surface (112, 312) has a complementary portion (112c, 312c) configured to interface with a complementary portion (122c, 222c) extending circumferentially about an outer surface (122, 222) of the one of the tube ring (120, 220) and the vibratory conduit (130a, 330);
   wherein the complementary portion (312c) of the sensor bracket (310) is comprised of a groove formed in the outer surface (312) of the sensor bracket (310) that is substantially symmetric about the axis (S) of the sensor bracket (310).

8. The sensor bracket (110) of claim 7, wherein the outer surface (112) comprises a cylindrical shape.

9. A tube ring (120, 220, 320) for a vibratory conduit (130a, 330), comprising:
   an outer surface (122, 222, 322) substantially symmetric about an axis (R), wherein:
   the axis (R) is substantially coaxial with an axis (T) of a vibratory conduit (130a, 330) when the tube ring (120, 220, 320) is affixed to the vibratory conduit (130a, 330); and
   the outer surface (122, 222, 322) has a complementary portion (122c, 222c, 322c) extending circumferentially about the outer surface (122, 222, 322) and configured to interface with a complementary portion (112a, 312c) of a sensor bracket (110, 310), the sensor bracket (110, 310) having an outer surface (112, 312) substantially symmetric about an axis (S);
   the tube ring (120, 220, 320) is substantially symmetric about the axis (R) of the tube ring (120, 220).

10. The tube ring (120, 220) of claim 9, wherein the complementary portion (122c, 222c) of the tube ring (120, 220) comprises a groove formed in the outer surface (122, 222) of the tube ring (120, 220).

11. The tube ring (320) of claim 9, wherein the outer surface (322) comprises a cylindrical shape.

* * * * *

UNITED STATES PATENT AND TRADEMARK OFFICE
CERTIFICATE OF CORRECTION

| | | |
|---|---|---|
| PATENT NO. | : 11,022,471 B2 | |
| APPLICATION NO. | : 16/310195 | |
| DATED | : June 1, 2021 | |
| INVENTOR(S) | : Robert Barclay Garnett et al. | |

It is certified that error appears in the above-identified patent and that said Letters Patent is hereby corrected as shown below:

In the Specification

Column 7, Line 29, replace "We" with --Wc--.

Column 8, Line 66, replace "We" with --Wc--.

Signed and Sealed this
Second Day of May, 2023

Katherine Kelly Vidal
*Director of the United States Patent and Trademark Office*